United States Patent [19]

Machut

[11] 4,383,283

[45] May 10, 1983

[54] DUAL MINI-DISK DRIVE

[75] Inventor: Dan M. Machut, Torrance, Calif.

[73] Assignee: Digital Equipment Corp., Maynard, Mass.

[21] Appl. No.: 191,834

[22] Filed: Sep. 29, 1980

Related U.S. Application Data

[63] Continuation-in-part of Ser. No. 84,508, Oct. 12, 1979, abandoned.

[51] Int. Cl.³ .......................... G11B 5/55; G11B 21/08
[52] U.S. Cl. ...................................... 360/97; 360/86; 360/106; 360/109; 360/128
[58] Field of Search ................................ 360/97–99, 360/86, 106, 128, 135, 137, 109

[56] References Cited

U.S. PATENT DOCUMENTS

| 3,429,578 | 2/1969 | Furuichi | 274/4 |
| 3,693,982 | 9/1972 | Barnett et al. | 360/106 X |
| 4,131,923 | 12/1978 | Wachs et al. | 360/106 |

FOREIGN PATENT DOCUMENTS

| 3339 | 8/1979 | European Pat. Off. | 360/106 |

*Primary Examiner*—John H. Wolff
*Attorney, Agent, or Firm*—Christie, Parker & Hale

[57] ABSTRACT

A disk drive comprising a first rotatable spindle for rotating removable flexible disks having magnetic surfaces for recording and retrieval of information and a motor for driving the spindle has an increased storage capacity by the addition of a second spindle driven by the motor in a direction opposite to the first spindle. The information storage capacity of the drive is further improved by increasing the track density of the disks while minimizing track seeking error of the magnetic read/write head associated with the disk. A stepper motor and lead screw are coupled to the magnetic read/write heads for radially positioning the heads to selected tracks of the received disks. The lead screw has a V-groove comprised of an alternating ramps and transition zones. As the lead screw rotates, a head carriage assembly having attached the first and second magnetic read/write heads is positioned radially by the transition zones while the ramps function to compensate for angular error of the stepper motor. By reducing angular error of the stepper motor, a concomitant increase in track seeking speed is achieved by permitting the stepper motor to operate at a greater angular velocity than would be obtainable without the lead screw of the invention. A further increase in track seeking speed is achieved by maintaining a headload pressure pad in close proximity to the surface of the disk opposite the surface to which the associated magnetic read/write head is closely positioned. Thus, upon command to contact the head with the magnetic surface of the disk, a reduced delay is achieved thus, improving track seeking speed.

11 Claims, 11 Drawing Figures

DUAL MINI-DISK DRIVE

CROSS REFERENCE TO RELATED APPLICATIONS

This application is a continuation-in-part of application Ser. No. 84,508, filed Oct. 12, 1979, now abandoned.

BACKGROUND OF THE INVENTION

The present invention relates to disk drive storage systems for digital computers.

Rotating magnetic data storage devices have been used in computer systems for over 25 years. Rotatable fixed and removable hard disks having magnetic surfaces have been employed for the recording and retrieval of data. The disk drives have a magnetic read/write head attached to a movable arm used to position the head over a selected concentric track. More recent developments have included utilization of removable flexible disks being comprised of a magnetically coated circular disk of mylar or other flexible material having a diameter of approximately 20.3 centimeters. Devices incorporating these flexible disks are more compact and have a much lower cost per drive than their predecessors using hard disks. One of the most recent developments in magnetic storage devices is the development of flexible mini-disks, the disks comprising a magnetically coated circular flexible plastic disk contained within a rigid envelope having cutouts for accessing the magnetic medium, the mini-disk having an outside diameter of approximately 13.3 centimeters. While these devices offer a further improvement in compactness and reduction in cost per disk drive, the cost per bit stored remains relatively high due to the fact that only a single mini-disk is driven by a mini-disk drive. Furthermore, the recording density of the mini-disk is restricted due to the fact that the number of concentric tracks or track density, is limited. This limitation results from error inherent in the means utilized in seeking the selected tracks. Finally, because the mini-disks are removable, the head-load pressure pad for contacting the surface of the mini-disk with the magnetic read/write head must be positioned a considerable distance from the disk in order to allow the disk to be inserted and removed without interference. This distance between the pressure pad and the disk results in significant delays in head-load time with concomitant increases in the mean time to seek a selected track. To summarize, currently available flexible mini-disk drives have inherent limitations in storage capacity and track seeking speed.

SUMMARY OF THE INVENTION

According to the invention in a magnetic storage system a rotatable member has a track with a circular component disposed about an axis and a translational component perpendicular to the circular component, the components together defining a pitch. The pitch of the track has alternating ramps and transition zones; the pitch of the transition zones is continuously variable and steeper than that of the ramps which preferably have a pitch greater than zero; the member is rotatably driven about the axis; a magnetic head support includes a follower for engaging the track such that the head support translates parallel to the translational component as the member rotates; a magnetic transducer head is mounted on the head support; a magnetic storage medium is transported past the head transverse to the translational component. The medium has a magnetic surface parallel to the translational component. The magnetic surface has information tracks transverse to the translational component that correspond in position to the ramps. Preferably, the magnetic storage medium is a disk, the rotatable member is a lead screw, and the track is helical.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENTS

The present invention greatly increases the storage capacity of a flexible disk drive without increasing its outside dimensions. Furthermore, increases in track seeking speed are also achieved while track seeking error is reduced and interchangeability of the removable disks is improved.

According to the invention, a drive apparatus for magnetically coated information storage disks comprising a chassis having a bezel attached perpendicularly to one end of the chassis, the bezel having first and second adjacent disk receiving slots aligned in planes parallel to the chassis; first and second spindles attached to either side of the chassis, the rotational axes of the spindles being substantially perpendicular to the plane of the chassis; a motor; means for coupling the motor to the spindles to rotatably drive the spindles in opposite directions of rotation and means for clamping disks received by the respective slots to the respective spindles to rotate such disks in opposite directions. Interposed between the parallel planes of the disk receiving slots is a head carriage assembly having a first magnetic read/write head and a second magnetic read/write head mounted on the carriage assembly in a back-to-back relationship to face disks received by the respective slots; means for intermittently loading the heads onto the surface of the disks received by the respective slots for the purpose of reading information from and writing information onto the received disks.

Because the disks are rotated in opposite directions, the first disk may be interchanged with the second disk and vice-versa without affecting the integrity of the data retrieved from the disk. Furthermore, by positioning the magnetic read/write heads between the adjacent surfaces of the parallel disks, the disk drive of the invention is more compact than drives where the disks are rotated in the same direction with the magnetic read/write heads being positioned on alternate surfaces.

Additionally, a single motor located between the the slots adjacent to the spindles, is utilized to drive the first and second spindles and the respective disks, thus a more compact drive is achieved compared to drives where each spindle has its own motor. The motor output shaft located at one end of the motor, has an axis of rotation substantially perpendicular to the axis of rotation of the spindles. At the other end of the motor is located a rotatable direction-changing pulley having an axis of rotation approximately parallel to the axis of rotation of the motor. An endless belt extends in a path around the output shaft, the pulley and the first and second spindles. This method of driving the spindles permits them to be rotated in opposite directions while being driven by the same motor.

The addition of the second drive spindle for the second disk, without increasing the external dimensions of the drive, doubles the storage capacity of the disk drive of the present invention when compared to previous drives employing a single spindle.

A cylindrical lead screw is employed for reproducibly selecting tracks on the disks. According to the invention, the lead screw design permits a substantial increase in storage capacity of the invention by substantially increasing the track density of the disks. The head carriage assembly has a cam follower which rides in a helical groove on the lead screw. The lead screw is attached to a stepper motor via a shaft. As the stepper motor is incremented about its rotational axis, the shaft rotates the lead screw thus causing the head carriage assembly to be repositioned radially with respect to the plane of the received circular disks.

Angular error which is inherent in this type of track seeking mechanism is compensated for by the design of the groove. The helical groove is comprised of a plurality of ramps of a constant pitch, adjacent ramps being connected by transition zones. The pitch of the ramps is dependent upon variable factors including the maximum angular error of the stepper motor, the desired track density, the inertial mass of the head carriage assembly and the diameter of the lead screw. As the lead screw rotates, the head carriage assembly is positioned radially by the transition zones while the ramps function to compensate for angular error of the stepper motor. Thus, any angular error will not result in track seeking error beyond a preselected limit.

Utilization of the alternating ramps and transition zones permits a higher track density because reduced track seeking error is achieved, thus the tracks can be located in closer proximity to one another than in previous drives where the lead screw did not incorporate a groove design according to the invention. Uniformity of track selection among drives is also improved by the reduction of track seeking error, thus the interchangeability of disks from one drive of the invention to another drive of the invention is improved. Finally, track seeking latency is reduced because the lead screw of the invention caan be rotated at a greater angular velocity while simultaneously compensating for the proportionally greater track seeking error that is inherent as the stepper motor speed increases.

According to the invention, track seeking latency is also reduced by permitting the head-load pressure pad to be maintained in close proximity to the disk prior to loading the magnetic read/write head onto the surface of the disk. As the disk is removed, however, the pad is repositioned a substantial distance from the disk to permit the disk to be removed or inserted without interference from the head or the head-load pressure pad. This aspect of the invention is accomplished by mechanically linking a disk clamping mechanism to its associated head-load pressure pad. Upon inserting a disk, a plate having a rotatable disk clamp attached is positioned over the center of the disk so that pressure from the clamp frictionally mates the disk to the spindle. Upon clamping the disk onto the spindle, the plate to which the clamp is attached is displaced about a fulcrum point toward the plane of the chassis and surface of the associated received disk. This displacement not only clamps the disk onto the spindle, but permits a head-load arm to which the head pressure pad is attached to be lowered in close proximity to the disk. Thus, while the disk is clamped in place, its associated magnetic read/write head and pressure pad are located in close proximity to the opposite surfaces of the disk. Upon command, the head-load pressure pad can be loaded onto the disk thus allowing recording or retrieval of information by the head with a reduced latency due to the close proximity of the pressure pad and magnetic read/write head to the opposite surfaces of their associated disks. Additionally head wear and disk wear are reduced by the selective loading and unloading of the pressure pad as compared to those systems where the head is continually in contact with the received disk.

Upon removal of the disk, the plate to which the rotatable clamp is attached is displaced away from the plane of the chassis and concomitantly the head-load arm and pressure pad are lifted away from the surface of the disk to permit easy removal without interference from the pressure pad or magnetic head.

With initial reference to FIGS. 1, 1A, 2 and 3, a dual flexible mini-disk drive 10 incorporating the principles of the invention is shown. The drive has a chassis 16 having a first side panel 13 and a second side panel 14 of equal dimensions each being perpendicualr to the plane of the chassis. In the preferred embodiment, the side panel height H and the chassis width W conform to established industry standards for a single mini-disk drive, the height H being 8.15±0.02 centimeters and the width W being 14.60+0.00, −0.05 centimeters. The side panels have pairs of guides 91 and 92 for positioning received mini-disks.

A bezel 17 is attached to one end of the chassis, the plane of the bezel being approximately perpendicular to the plane of the chassis. The bezel 17 has a first slot 18 and a second slot 19 lying in planes parallel to the chassis 16 for receiving selectively removable mini-disks 42. The received mini-disks also lie in planes parallel to the plane of the chassis. A first spindle 21 and a second spindle 22 are disposed on either side of the chassis and are journaled by bearings for independent rotation on a shaft 25, which is press fit into the chassis. The spindles are thus aligned on an axis traverse to the plane of the chassis. A first movable plate 23 and a second movable plate 24 are attached to chassis supports 26 and 27, respectively, the supports being located at the end of the chassis opposite the end to which the bezel is attached. The plates 23 and 24 are pivotally mounted to the chassis supports by means of flat springs 28 and 29, respectively, which urge plates 23 and 24 away from the plane of the chassis 16, i.e., away from each other.

Figure 1:
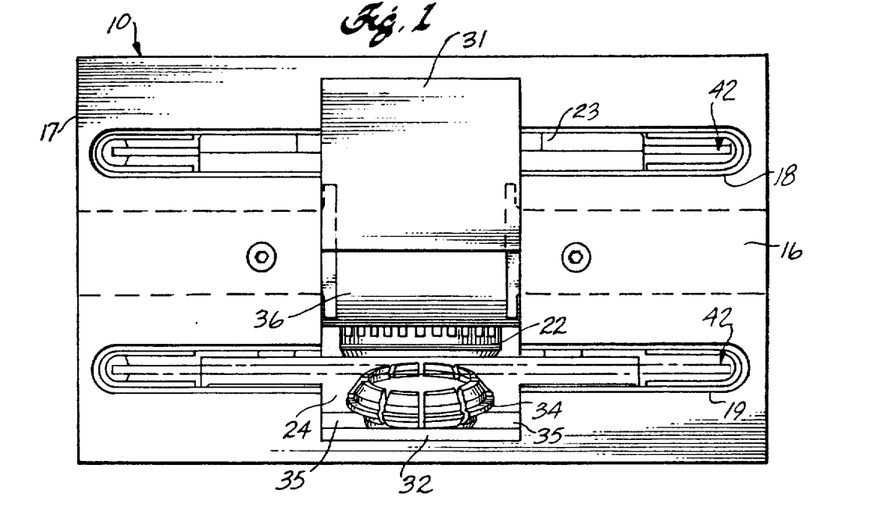
FIG. 1 is a front elevation view of a dual mini-disk drive incorporating the principles of the invention.
Figure 1A:
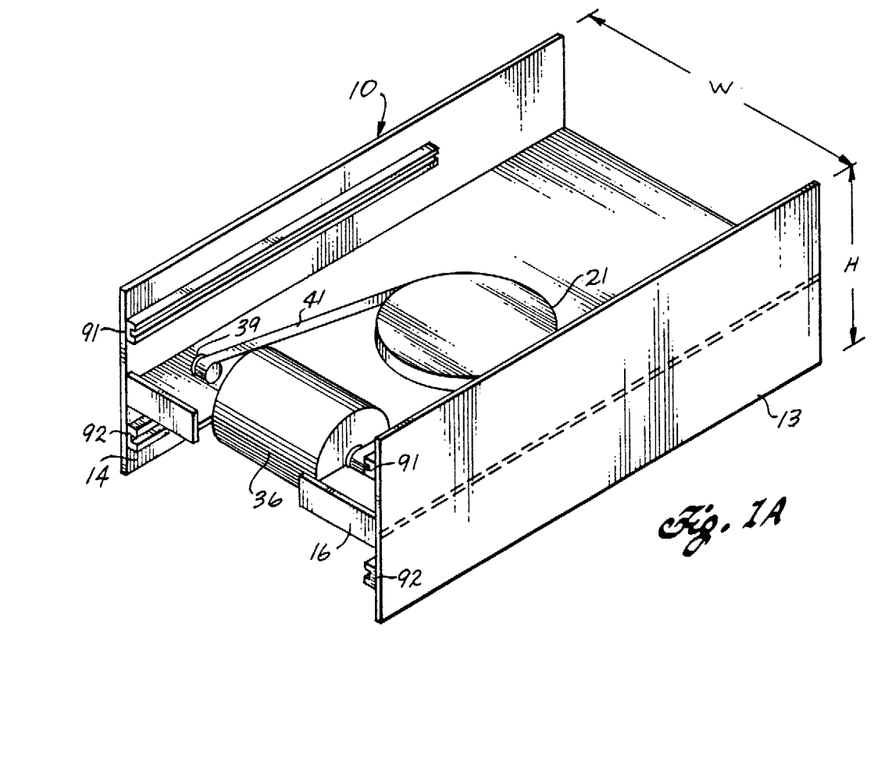
FIG. 1A is a perspective view of part of the dual mini-disk drive having the bezel removed.
Figure 3:
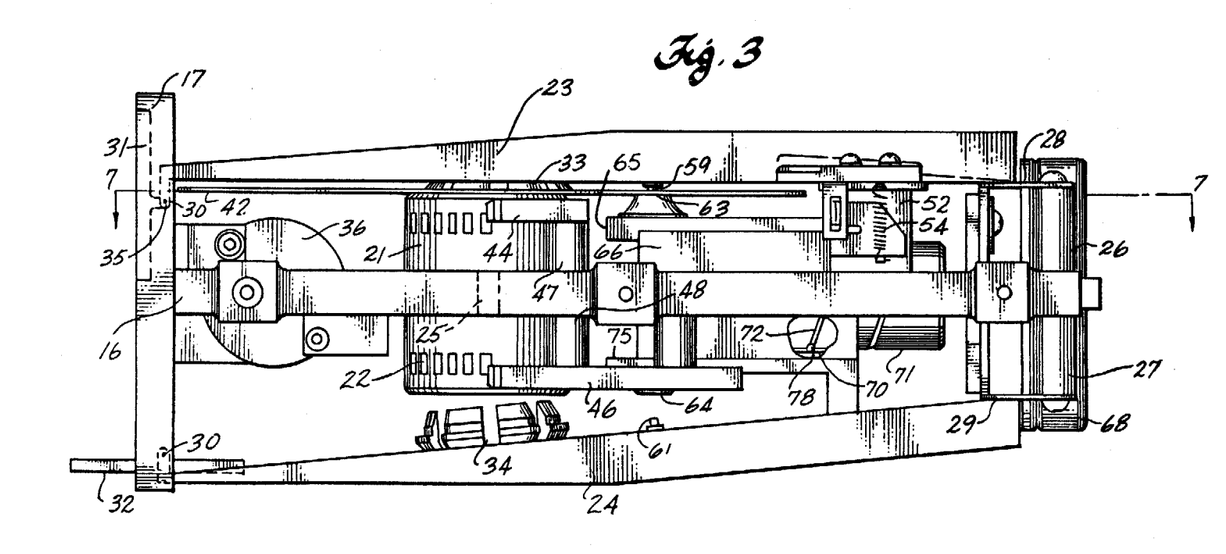
FIG. 3 is a side elevation view of the dual mini-disk drive.

A mini-disk 42 has a central circular opening, the periphery of which is selectively clamped to the first spindle 21 or the second spindle 22 by a first rotatable disk clamp 33 or a second rotatable disk clamp 34, respectively. The clamps are attached to the movable plates 23 and 24, respectively, and have a periphery that is elastically compressible by virtue of the slots formed therein. A first locking door 31 and a second locking door 32 are rotatably coupled to the end of the movable plates, 23 and 24 respectively. Each door is pivotally attached by means of pins 30 which connect the end of the plates 23 and 24 to tabs 35 protruding from the surface of the doors. Upon insertion, a mini-disk is clamped onto its respective spindle by the user lifting the end of the door extending away from the plane of the bezel while simultaneously rotating it to a position flush with the bezel. This operation locks the plate and clamp into a fixed position which results in the frictional mating of the mini-disk to its respective spindle. The mini-disk may be removed by rotating the respective door to a position approximately perpendicular to the plane of the bezel, thus allowing the tension created in the flat springs 28 and 29 to reposition the plates 23 and 24 away from the plane of the chassis and permit removal of the received mini-disk. As the locking door rotates from a plane parallel to its respective movable plate, i.e., in the open position to a plane perpendicular to its respective movable plate, i.e., in the closed position, the movable plate pivots toward the plane of the chassis and the clamp engages the disk.

Figure 2:
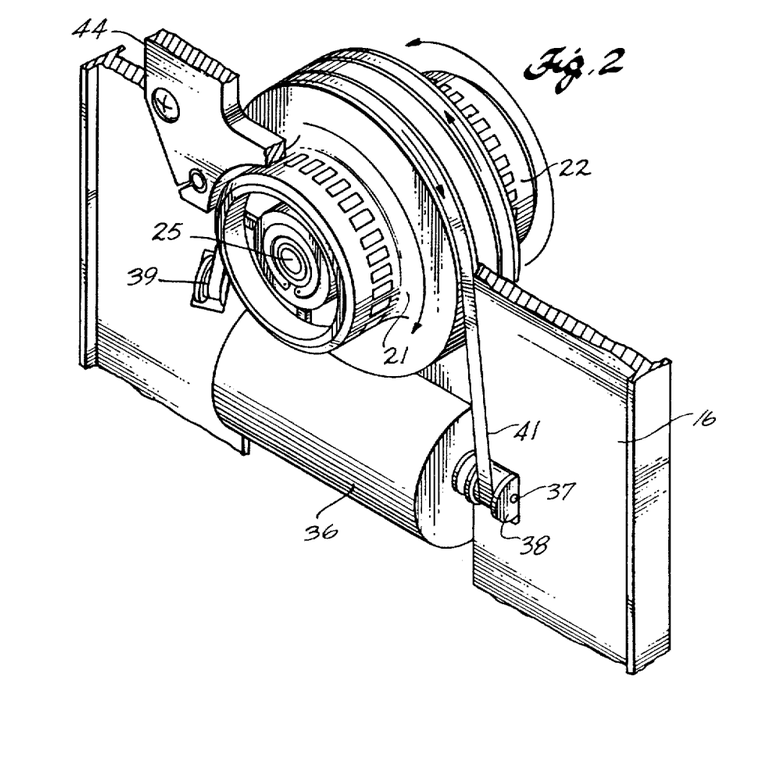
FIG. 2 is a fragmentary perspective view depicting the apparatus for rotating the disks in opposite directions.

A motor 36 for driving the spindles in opposite directions is mounted on the chassis between the slots 18 and 19 and adjacent to the spindles 21 and 22, the output shaft 37 of the motor having an axis of rotation substantially perpendicular to the axis of the spindles. A drive pulley 38 is attached to the output shaft 37 of the motor 36. Mounted on the chassis near the other end of the motor is a rotatable, direction-changing pulley 39 having an axis of rotation lying in the same plane as the axis of rotation of the output shaft 37. An endless drive belt 41 passes over the drive pulley 38, second spindle 22, direction-changing pulley 39, and first spindle 21. The direction of the belt is reversed by the drive pulley and the direction-changing pulley such that the first spindle and the second spindle are driven in opposite directions; thus, mini-disks clamped to the first and second spindles also rotate in opposite directions.

Magnetic read/write heads 63 and 64 are positioned back-to-back between the planes of the slots 18 and 19 so, as seen by heads 63 and 64, the mini-disks clamped to spindles 21 and 22 rotate in the same direction, i.e., clockwise. As a result, both mini-disks can be addressed for reading and writing purposes in the same manner, i.e., by the same electronic circuitry, because the disks are moving past the heads in the same direction relative to the heads.

FIG. 3 depicts mini-disk 42 clamped onto the first spindle 21 by the first disk clamp 33 with plate 23 in a "closed" position. As plate 23 moves into the closed position, clamp 33 moves into the central opening of the mini-disk with a force fit, thereby compressing the periphery of clamp 33 and centering the mini-disk thereon. When plate 23 is in the closed position, the end of clamp 33 lies inside the center opening of spindle 21. The faces of the mini-disk are clamped between the surfaces of clamp 33 and spindle 21 parallel thereto. The second plate 24 is shown in an "open" position. When in the closed position, the plate 23 or 24 is repositioned to a plane parallel with that of the chassis 16. In the open position, the plate 23 or 24 is urged away from a plane parallel to that of the chassis 16 by tension in the springs 28 and 29, respectively.

A first reference plane 44 and a second reference plane 46 are attached to the chassis 16 by means of supports 47 and 48, respectively. The reference planes serve to maintain the flexible disk in a plane parallel to the axis of radial displacement of the magnetic heads.

Figure 4:
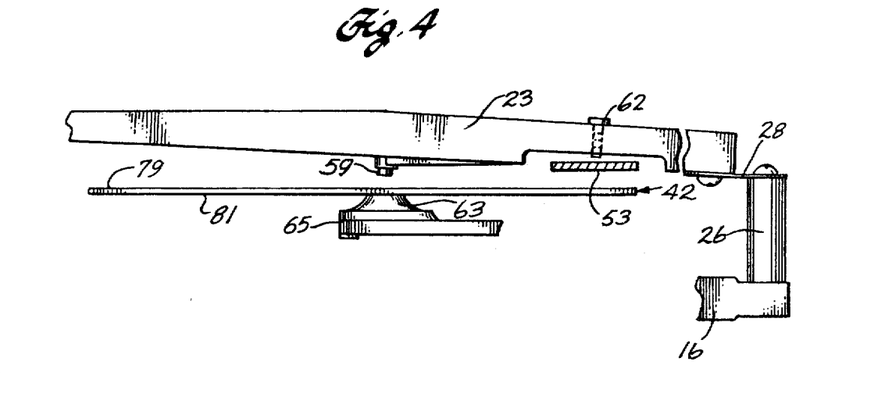
FIG. 4 is a side view of a magnetic read/write head and associated plate in the open position.
Figures 5, 9, 10:
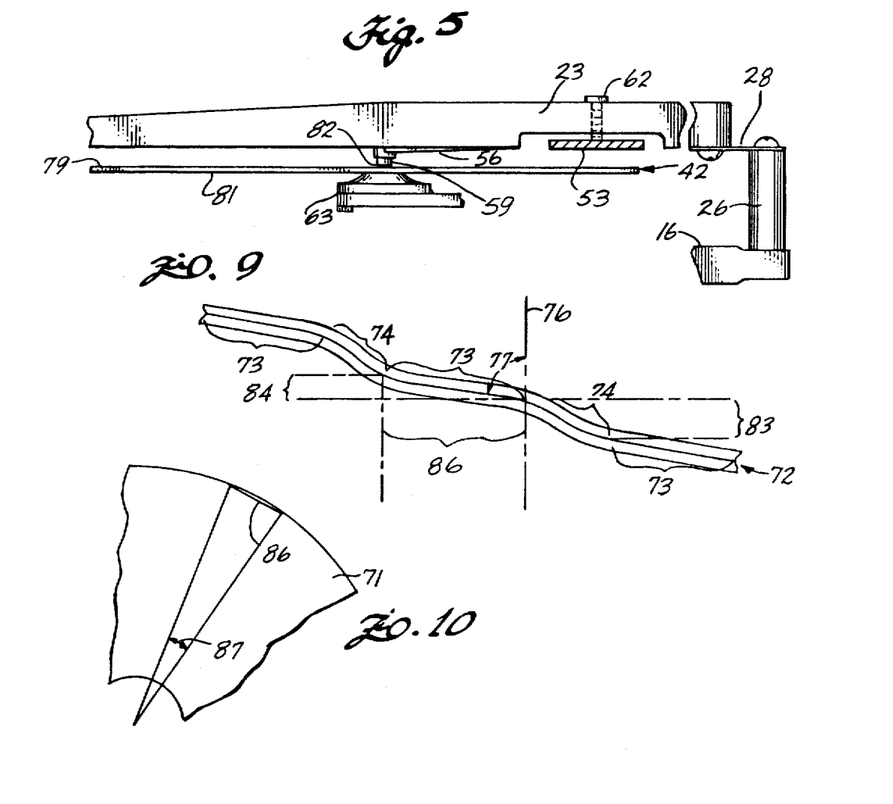
FIG. 5 is a side view of the magnetic read/write head and associated plate in the closed position.
FIG. 9 is a detail of the lead screw thread of the invention.
FIG. 10 is a schematic end view of a portion of the lead screw of the invention.
Figure 6:
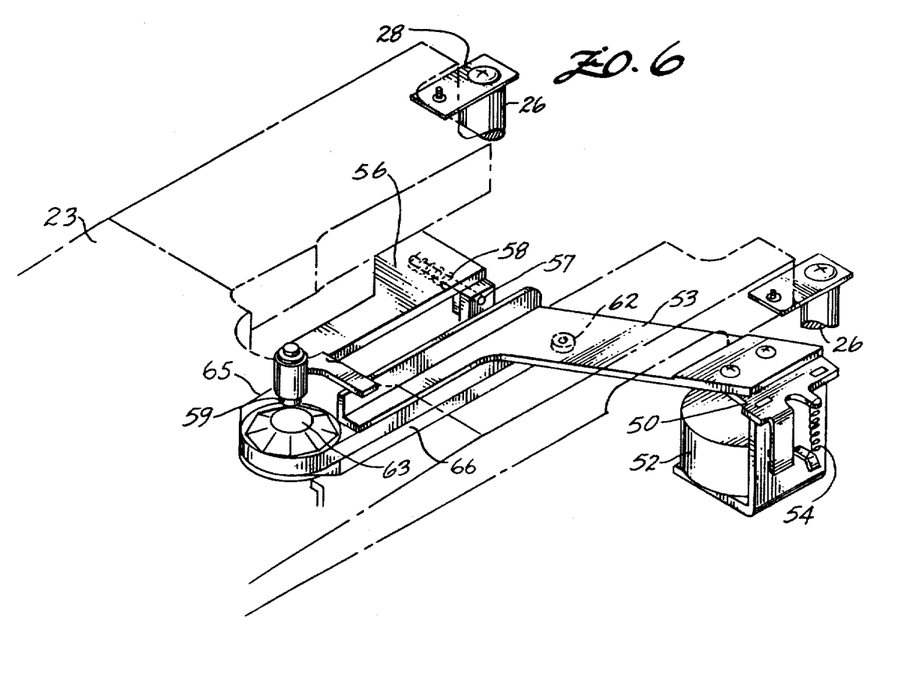
FIG. 6 is a perspective view depicting the magnetic read/write head loading mechanism of the invention.

In FIGS. 4, 5, 6, and 7, the head-load mechanism according to the invention is shown. FIG. 6 depicts a perspective of the essential elements of the head-load mechanism associated with the first spindle 21. Those elements associated with the second spindle 22 are substantially identical; therefore, the description is limited to those elements associated with the first spindle. A solenoid 52 is attached to the chassis 16. A lifter arm 53 is attached to an armature 50, which has one end pivotally attached to the solenoid, the lifter arm being urged away from the plane of the chassis 16 by a lifter arm spring 54 up against a set screw 62 mounted on plate 23. A head-load arm 56 is pivotally attached by an axle 57 to a head carriage assembly described below. A head-load arm spring 58 urges a pressure pad 59 on arm 56 toward the plane of the chassis. While solenoid 52 is not activated, spring 58 urges arm 56 against lifter arm 53, which is spaced a predetermined distance from the plate 23 by set screw 62. A first magnetic read/write head 63 and a second magnetic read/write head 64 are mounted on the ends of respective head support brackets 65 and 75, which are attached to a lead screw follower block 66. Heads 63 and 64, brackets 65 and 75, and block 66 comprise a head carriage assembly which moves parallel to the plane of the received mini-disk in a radial direction relative to the axis of the spindles 21 and 22 on carriage rails 67 (FIG. 7) which are anchored to the chassis. Carriage rails 67 extend through passages, not shown, in block 66 or a separate member attached thereto. Heads 63 and 64 are cantilevered off the end of block 66 facing spindles 21 and 22 by brackets 65 and 75 in line with the disk engaging portions of the spindles as shown in FIG. 3. The hidden line labeled 66 in FIG. 7 designates the end of the block facing spindles 21 and 22, which is in line with the belt engaging portions of the spindles. Thus, although the radial progress of block 66 toward the axis of the spindles is limited by the large diameter of the belt engaging portions of spindles 21 and 22 (see FIGS. 2 and 7), heads 63 and 64 are able to move closer to the axis of the spindles than block 66 by virtue of the cantilevered construction, thereby permitting access by heads 63 and 64 to the full data storage surface of the disks.

In an alternative preferred embodiment third and fourth magnetic read/write heads replace the pressure pads 59 and 61, respectively. These additional heads permit recording and retrieval of information from both sides of a mini-disk without the necessity of removing, turning over and reinserting the mini-disk into the drive.

In FIG. 4, the plate 23 is shown in the open position. The pressure pad 59 is urged by spring 54 away from the plane of the chassis 16 thus permitting easy insertion and removal of the mini-disk 42 without interference from the pressure pad 59 or the magnetic read/write head 63. FIG. 5 depicts the plate 23 in the closed position, in which the pressure pad 59 lies in close proximity to the surface of the mini-disk 42.

In the open position, the plate 23 is urged away from the plane of the chassis 16 by the force created in the springs 28 attaching the plate to the chassis supports 26; the lifter arm 53 under tension from the solenoid spring 54 lifts the head-load arm 56 away from the plane of the chassis thus overcoming the lesser opposing force of spring 58. In the closed position, the plate 23 is moved toward the plane of the chassis and locked in that position by the user rotating the locking door 31 into a position flush with the bezel 17. As the plate is moved into the closed position, this motion is transferred by set screw 62 to lifter arm 53. As a result, the head-load arm 56 and the lifter arm 53 are also moved toward the plane of the chassis which causes the head-load arm to position the attached head-load pressure pad into closely spaced proximity to the plane of an inserted mini-disk. When the mini-disk is clamped onto its respective spindle by positioning the plate to the closed position, the gap between the head and the mini-disk is maintained at a minimum by adjustment of set screw 62. Upon command, the solenoid 52 is activated to draw the armature 50 toward the solenoid and position the lifter arm 53 to a point in closer proximity to the plane of the received mini-disk than the position determined by the plate 23 and the set screw 62. This repositioning upon command permits the heaad-load arm 56 to transmit the force of the spring 58 through the pressure pad 59 unto the surface 79 of the mini-disk opposite the surface 81 in proximity to the magnetic read/write head 63. Thereupon, the magnetic read/write head contacts the surface 81 of the mini-disk to enable either recording or retrieval of magnetic information.

Because plate 23 brings pressure pad 59 into close proximity to the mini-disk as the user closes the loading door 31, the latency betwen the head-load command to the solenoid and the actual loading of the pressure pad is substantially reduced. This reduction in latency permits greater track seeking speed to be achieved as head-load delay is minimized. Additionally because the gap 82 is reduced by the invention, the pressure pad 59 strikes the surface of the mini-disk 79 with less force thus reducing bounce and head settling time.

Figure 7:
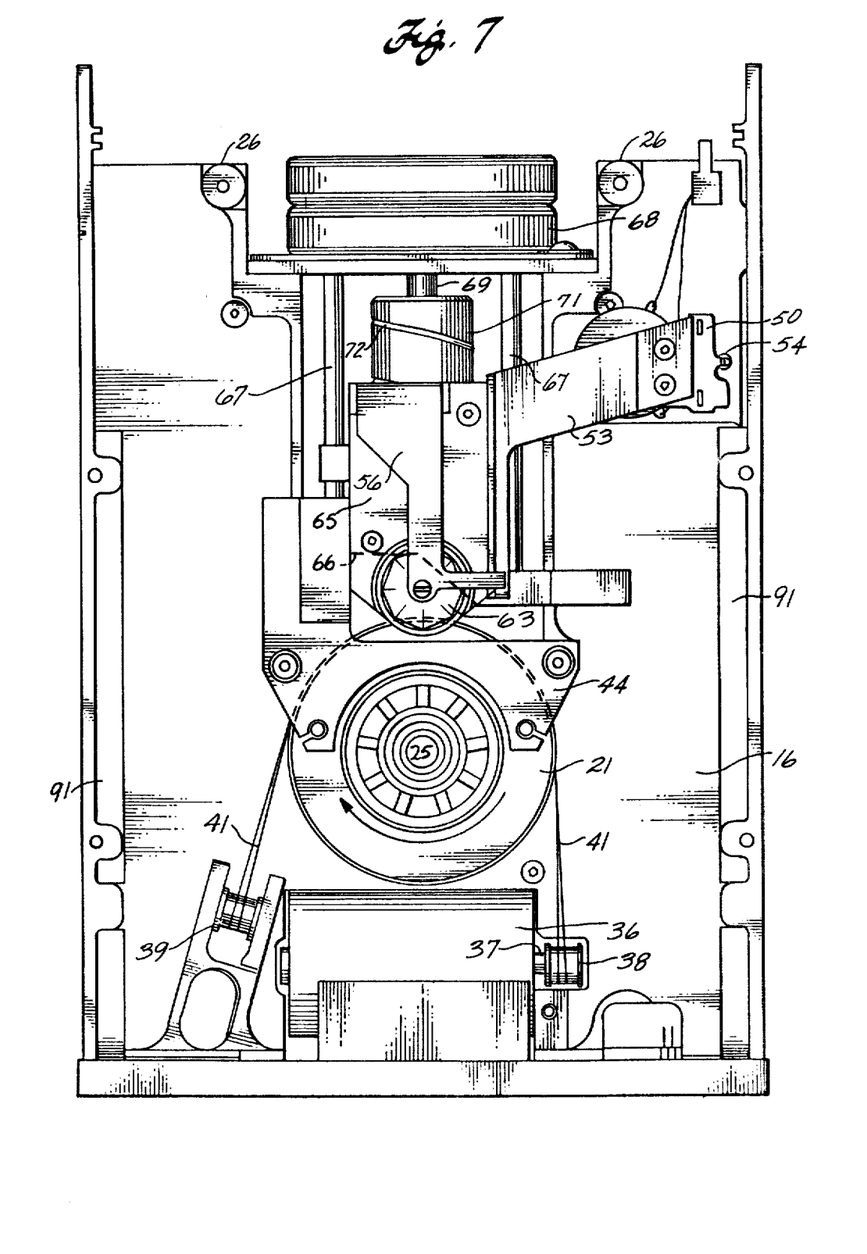
FIG. 7 is a plan view on line 7—7 of FIG. 3.
Figure 8:
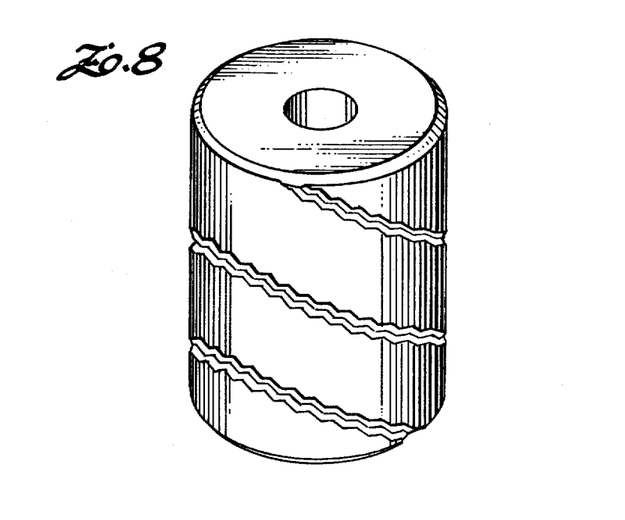
FIG. 8 is a perspective view of the lead screw of a disk drive incorporating principles of the invention.

With reference to FIGS. 7, 8 and 10, elements of the track seeking mechanism according to the invention are shown. Attached to the chassis 16 is a stepper motor 68 whose rotational axis is perpendicular to the rotational axis of the first spindle 21 and the second spindle 22. To the stepper motor's output shaft 69 is attached a lead screw 71 having a helical track for example in the form of a V-groove 72. Upon command, the stepper motor 68 rotates in equal increments the shaft 69 and the lead screw 71. The head carriage assembly 66 has the first magnetic read/write head 63 and the second magnetic read/write head 64 mounted coaxially such that the heads are aligned on an axis substantially parallel to the axis of the spindles 21 and 22. The head carriage assembly is positioned between the planes of the slots 18 and 19, the heads being mounted on the head carriage assembly in a back-to-back relationship to face the adjacent surfaces of the mini-disks received by the respective slots for selectively recording and retrieving information. The head carriage assembly is positioned radially with respect to the axis of the mini-disks in order to reproducibly position the heads over selected tracks of the mini-disks. A follower such as a ball 78 (FIG. 3) is attached to lead screw follower block 66 by means of a flat spring 70 or other means to link the head-block assembly to the lead screw 71. The lead screw has a helical V-groove 72 for radially positioning the head carriage assembly. Ball 78 is spring loaded by spring 70 to ride in V-groove 72 as the lead screw rotates. As the stepper motor rotates, the shaft and lead screw cause the head carriage assembly to be repositioned radially. The head carriage assembly slides freely along carriage rails 67 such that movement of the head carriage assembly is limited along an axis radial to the disks and is bi-directional depending upon the direction of rotation of the stepper motor; thereby, any concentric track on the surface of either mini-disk may be selected.

With reference to FIGS. 8 and 9, the details of the lead screw 71 of a dual mini-disk drive incorporating principles of the invention are shown. FIG. 8 is perspective view of a lead screw 71 having a helical V-groove 72 on its surface. In the preferred embodiment, the cross-sectional profile of the V-groove has an angle of approximately 70°. FIG. 9 depicts a portion of the V-groove in detail.

According to the invention, the helical V-groove is comprised of alternating rest zones 73 and transition zones 74 having different pitches dependent in value upon variable factors including the maximum stepper motor angular error, the desired track density, the inertial mass of the head carriage assembly and the diameter of the lead screw. Rest zones 73 correspond in position to the tracks on the disk and transition zones 74 correspond to the spacing between tracks thereon. Preferably, the rest zones have zero pitch, i.e., they lie in a plane perpendicular to the screw axis. But if the spacing between tracks is too large, the rest zones may need to have a pitch larger than zero, albeit still smaller than the pitch of the transition zones, to prevent undue oscillation of lead screw follower 78. For the following example, it is assumed the rest zones have a pitch larger than zero, i.e., they are in the form of ramps.

The ramps are defined by two orthogonal components: an axial or translational component 84 parallel to the rotation axis 76 of the lead screw 71 and a circumferential or circular component 86 perpendicular to the rotational axis of the lead screw. The parallel component 84 represents the total permissible alignment error of the head with respect to the selected track. As this component is reduced, the angle 77 of the ramp approaches 90°. However, the acceleration of the head carriage assembly 66 from a transition zone 74 to a ramp 73 also increases as the angle 77 increases. As the acceleration increases, the lead screw follower 78 may exhibit an undesirable oscillation within the V-groove. Thus, the component 84 of the ramp 73 parallel to the rotational axis 76 is selected to be as small as possible, preferably zero, to keep the lead screw follower oscillation to a minimum. In one embodiment, the ramp component 84 is approximately 0.003 centimeter in order to achieve a track seeking error of approximately ±0.0015 centimeter. The angle 77 in the preferred embodiment is approximately 83°.

The component 86 perpendicular to the rotational axis 76 is the chord length 89, subtended by a radial angle 87 equal to approximately twice the maximum stepper motor angular error. The radial angle 87 is the angle projected on a plane perpendicular to the rotational axis of the lead screw, the vertex of the angle being positioned on the rotational axis of the screw. In one embodiment, the radial angle 87 equals approximately two degrees and the radius of the lead screw is approximately 1.15 centimeters. Thus, the resultant chord length 89 equals 0.02 centimeters.

The transition zones 74 alternate with and connect the ramps 73 and have an axial component 83 parallel to the axis of rotation of the lead screw 76 which is approximately equal to the distance between the tracks of the disk. In one embodiment, this component 83 is approximately 0.025 centimeters. As shown in FIG. 9, the pitch of transition zones 74 is steeper than the pitch of ramps 73. The preferred embodiment has transition zones which have a continually changing pitch, steeper in the middle than at the ends, in order that the lead screw follower may slow down as it approaches the ramps. Thus, the head carriage assembly 66 smoothly makes the transition between adjacent ramps while minimizing the acceleration near the ramps. In summary, the use of different pitches permits more accurate head-track alignment in the positioning of head carriage assembly 66 than a constant steep pitch and permits faster positioning of head carriage assembly 66, and thus shorter access time to the data on the disks than a constant gradual pitch. In operation, while stepper motor 68 rotates incrementally from one rest position to another, ball 78 engages ramps 73 when the motor is in the rest positions and engages transition zones 74 when the motor is rotating from one rest position to the other. The circumferential component of transition zones 74 corresponds to one or more angular increments of the stepper motor.

The described embodiments of the invention are only considered to be preferred and illustrative of the inventive concepts; the scope of the invention is not to be restricted to such embodiment. Various and numerous other arrangements may be devised by one skilled in the art without departing from the spirit and scope of this invention. For example, the track on the lead screw could be raised instead of a groove in which case the follower would have to be modified to engage the raised track. Further the track seeking mechanism and the head loading mechanism could be employed in a single disk drive packaged in the conventional manner. The method of rotating the disks in opposite directions or recording or retrieving information from their adjacent surfaces may be incorporated in data storage systems utilizing 20.3 centimeter flexible disks or fixed and removable hard disks. The advantage of a more compact drive and utilization of a single motor would be achieved in any of these alternative embodiments. Additionally, the means for reducing head-load delay described herein could be incorporated in a number of storage systems having removable media other than those utilizing mini-disks.

What is claimed is:

1. A magnetic storage system comprising:
a rotatable member having a track with a circular component disposed about an axis and a translational component perpendicular to the circular component to define a pitch, the pitch of the track having alternating rest zones and transition zones, the pitch of the transition zones being continuously variable between the rest zones;
means for rotatably driving the member about the axis;
a magnetic head support including means for engaging the track such that the head support translates parallel to the translational component as the member rotates;
a magnetic transducer head mounted on the head support; and
means for transporting a magnetic storage medium past the head transverse to the translational component, the medium having a magnetic surface parallel to the translational component, the magnetic surface having data tracks transverse to the translational component that correspond in position to the rest zones.

2. The system of claim 1, in which the driving means is a stepper motor rotating the member incrementally from one rest position to another and the track engaging means engages the ramps when the motor is in the rest positions and engages the transition zones when the motor is rotating from one rest position to the other.

3. The system of claim 1, in which the translational component positions of the rest zones correspond to the positions of the respective data tracks on the magnetic surface, the translational component positions of the transition zones correspond to the spacing between respective data tracks on the magnetic surface, and the pitch of the transition zones is steeper than that of the rest zones.

4. The system of claim 3, in which the pitch of the rest zones is approximately zero.

5. The system of claim 1, in which the pitch of the transition zones gradually decreases between the middle of the transition zones and the adjacent rest zones.

6. Magnetic disk drive apparatus comprising:
a disk receiving spindle supported to rotate about an axis;
a lead screw having a generally helical track;
means for rotatably driving the lead screw about an axis perpendicular to the spindle axis;
a lead screw follower including means for engaging the track such that the follower translates radially of the spindle axis as the lead screw rotates;
a magnetic transducer head; and
means for mounting the head on the follower;
characterized in that the track has alternating ramps and transition zones, the pitch of the transition zones being steeper than that of the ramps and the pitch of the ramps being larger than zero.

7. The apparatus of claim 6, in which the transition zones have a continually changing pitch, steeper in the middle than at the ends.

8. The apparatus of claim 6, in which the driving means comprises a motor coupled to the lead screw to rotatably drive same.

9. The apparatus of claim 8, having a specified head alignment error when the motor has a given angular error, the circumferential component of each ramp being equal to approximately twice the motor angular error and the axial component of each ramp being approximately equal to the specified head alignment error.

10. The apparatus of claim 6, in which the driving means comprises a stepper motor rotating the lead screw incrementally from one rest position to another and the track engaging means engages the ramps when the motor is in the rest positions and engages the transition zones when the motor is rotating from one rest position to the other.

11. A magnetic storage system comprising:
a rotatable member having a track with a circular component disposed about an axis and a translational component perpendicular to the circular component to define a pitch, the pitch of the track having alternating rest zones and transition zones, the pitch of the transition zones gradually decreasing from the middle to the adjacent rest zones;
means for rotatably driving the member about the axis;

a magnetic head support including means for engaging the track such that the head support translates parallel to the translational component as the member rotates;

a magnetic transducer head mounted on the head support; and means for transporting a magnetic storage medium past the head transverse to the translational component, the medium having a magnetic surface parallel to the translational component, the magnetic surfaces having date tracks transverse to the translational component that correspond in position to the rest zones.

* * * * *